(12) United States Patent
Froitzheim et al.

(10) Patent No.: US 10,078,928 B2
(45) Date of Patent: Sep. 18, 2018

(54) DRIVER CIRCUIT FOR AN INDUCTOR COIL

(71) Applicant: Continental Automotive GmbH, Hannover (DE)

(72) Inventors: Herbert Froitzheim, Pettendorf (DE); Dieter Sass, Regensburg (DE); Norbert van der Heyd, Bad Abbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 136 days.

(21) Appl. No.: 15/108,964

(22) PCT Filed: May 11, 2015

(86) PCT No.: PCT/EP2015/060283
§ 371 (c)(1),
(2) Date: Jun. 29, 2016

(87) PCT Pub. No.: WO2015/173163
PCT Pub. Date: Nov. 19, 2015

(65) Prior Publication Data
US 2018/0204400 A1    Jul. 19, 2018

(30) Foreign Application Priority Data
May 12, 2014    (DE) .................. 10 2014 208 880

(51) Int. Cl.
*G05B 19/00*    (2006.01)
*G07C 9/00*    (2006.01)
(Continued)

(52) U.S. Cl.
CPC .......... *G07C 9/00111* (2013.01); *B60R 25/24* (2013.01); *G07C 9/00182* (2013.01);
(Continued)

(58) Field of Classification Search
CPC ............ G07C 9/00111; G07C 9/00182; G07C 9/00674; G07C 9/00714; G07C 2009/00301; B60R 25/24; H01Q 1/3241
See application file for complete search history.

(56) References Cited

U.S. PATENT DOCUMENTS 3,815,008 A * 6/1974 Studtmann ................ G05F 5/00
363/124
4,438,486 A * 3/1984 Ferraro ............ H03K 17/08146
363/134
(Continued)

FOREIGN PATENT DOCUMENTS

FR    2828286 A1    2/2003    ............ B60R 25/20
JP    2011101524 A    5/2011    ............ H02J 17/00
(Continued)

OTHER PUBLICATIONS

International Search Report and Written Opinion, Application No. PCT/EP2015/060283, 15 pages, dated Aug. 10, 2015.
(Continued)

*Primary Examiner* — Joseph Feild
*Assistant Examiner* — Rufus Point
(74) *Attorney, Agent, or Firm* — Slayden Grubert Beard PLLC

(57) ABSTRACT

A driver circuit, a method for operating an inductor coil and an active transmission system, wherein a capacitor is charged by means of a charging current to a reference voltage and the charged capacitor is discharged in an oscillating manner via the inductor coil. The inductor coil is short-circuited when the voltage on the capacitor or a current flowing in the inductor coil has passed through at least one complete oscillating period.

19 Claims, 5 Drawing Sheets

(51) Int. Cl.
  B60R 25/24  (2013.01)
  H01Q 1/32  (2006.01)

(52) U.S. Cl.
  CPC ..... G07C 9/00674 (2013.01); G07C 9/00714 (2013.01); *G07C 2009/00301* (2013.01); *H01Q 1/3241* (2013.01)

(56) References Cited

U.S. PATENT DOCUMENTS

| | | | | | |
|---|---|---|---|---|---|
| 4,504,155 | A | * | 3/1985 | Ruggieri | G04F 10/10 368/121 |
| 5,086,205 | A | * | 2/1992 | Thommes | B23K 10/00 219/121.39 |
| 5,126,931 | A | * | 6/1992 | Jitaru | H02M 3/33569 363/131 |
| 5,262,931 | A | * | 11/1993 | Vingsbo | H02M 3/07 323/222 |
| 5,694,303 | A | * | 12/1997 | Silberkleit | H02M 3/158 363/131 |
| 5,917,722 | A | * | 6/1999 | Singh | H02M 7/538 363/132 |
| 6,211,746 | B1 | | 4/2001 | Segawa et al. | 331/143 |
| 7,126,344 | B2 | | 10/2006 | Rocher | 324/546 |
| 7,352,162 | B1 | | 4/2008 | Chang et al. | 323/290 |
| 9,378,888 | B2 | | 6/2016 | Hosotani | |
| 9,802,572 | B2 | * | 10/2017 | Froitzheim | H03K 17/133 |
| 2003/0043607 | A1 | * | 3/2003 | Vinciarelli | H02M 1/4208 363/61 |
| 2004/0037100 | A1 | * | 2/2004 | Orr | H02M 3/33561 363/131 |
| 2006/0093017 | A1 | * | 5/2006 | Gong | H02M 3/33507 375/134 |
| 2007/0188967 | A1 | * | 8/2007 | Smith | H01F 7/1816 361/155 |
| 2009/0302685 | A1 | * | 12/2009 | Kramer | B60L 11/005 307/80 |
| 2010/0160134 | A1 | * | 6/2010 | Scibona | A61M 1/3693 494/10 |
| 2011/0026277 | A1 | * | 2/2011 | Strijker | H02M 3/33523 363/21.07 |
| 2012/0068548 | A1 | | 3/2012 | Endo et al. | 307/104 |
| 2013/0194847 | A1 | * | 8/2013 | Taddeo | H02M 1/10 363/123 |
| 2013/0234531 | A1 | | 9/2013 | Budgett et al. | 307/104 |
| 2013/0308358 | A1 | * | 11/2013 | Usami | H02M 7/04 363/84 |
| 2016/0250995 | A1 | * | 9/2016 | Froitzheim | H03K 17/133 340/5.64 |
| 2017/0331179 | A1 | * | 11/2017 | Froitzheim | H01Q 1/3241 |

FOREIGN PATENT DOCUMENTS

| | | | | |
|---|---|---|---|---|
| TW | 200816642 A | 4/2008 | ............... | H03K 7/00 |
| WO | 2012/035745 A1 | 3/2012 | ............... | H02J 17/00 |
| WO | 2012/101907 A1 | 8/2012 | ............... | H02J 17/00 |
| WO | 2013/024396 A1 | 2/2013 | ............... | H02J 7/02 |
| WO | 2013/112526 A1 | 8/2013 | ............... | B60L 11/18 |
| WO | 2013/164831 A1 | 11/2013 | ............... | H02J 7/02 |
| WO | 2015/173163 A1 | 11/2015 | ............... | G07C 9/00 |

OTHER PUBLICATIONS

German Office Action, Application No. 102014208880.1, 5 pages, dated Dec. 2, 2015.

Chinese Office Action, Application No. 201580002096.8, 5 pages, dated Nov. 14, 2017.

Japanese Office Action, Application No. 2016519374, 2 pages, dated May 29, 2017.

\* cited by examiner

DRIVER CIRCUIT FOR AN INDUCTOR COIL

CROSS-REFERENCE TO RELATED APPLICATIONS

This application is a U.S. National Stage Application of International Application No. PCT/EP2015/060283 filed May 11, 2015, which designates the United States of America, and claims priority to DE Application No. 10 2014 208 880.1 filed May 12, 2014, the contents of which are hereby incorporated by reference in their entirety.

TECHNICAL FIELD

The disclosure generally relates to a driver circuit for an inductor coil, and more specifically to an inductive antenna, a method for operating an inductor coil, and an active transmission system having a driver circuit.

BACKGROUND

Keyless vehicle entry and start-up systems such as, for example, the Passive Start Entry (PASE) system, are automatic systems for the unlocking of a vehicle without the active use of a vehicle key, and the start-up thereof by the simple actuation of a start button. This is made possible by an electronic key with a chip, which the driver carries with them. Periodically, via at least one antenna which is fitted thereto, the vehicle transmits an encoded request signal in the LF frequency band (LF stands for "Low Frequency", for example frequencies ranging from 20 kHz to 200 kHz). The system then switches over to a reception mode in the UHF frequency band (UHF stands for "Ultra High Frequency", for example frequencies in the three-figure MHz range) and awaits confirmation.

If a key fitted with a transponder is within range, the latter receives the LF signal, decodes it, and retransmits it as a newly-encoded UHF signal. The UHF signal is decoded in the vehicle. As the vehicle is familiar with both coding tables, it is able to compare its own original transmission with the signal received and, where the two coincide, to permit access. If no correct response is received within a specified time period, nothing will happen, and the system switches back to standby mode. The engine start-up process essentially corresponds to the access control process, with the exception that, in this case, the engine start button is to be actuated.

As an antenna for the transmission of the LF signal, an inductive antenna is primarily used, which may be configured, for example, as a ferrite core with a winding (also described as a "magnetic antenna" or "ferrite antenna"). In many cases, the inductor coil of the inductive antenna is operated in combination with a capacitor in an oscillating circuit. By the maintenance of the highest possible quality and accurate frequency control, the energy consumption of an oscillating circuit of this type is generally kept low, so that total current consumption of the access and start-up system is maintained as low as possible. Low current consumption, for example, is desirable in itself on the grounds that, where the vehicle is stationary for a prolonged period, the vehicle battery would otherwise be rapidly discharged. However, the requirement for high quality restricts the data transmission rate, and the accurate tuning associated with high quality involves some degree of complexity. In consequence, conventional arrangements generally represent an unsatisfactory compromise between the data rate, complexity and energy consumption.

SUMMARY OF THE INVENTION

The present disclosure teaches an improved driver circuit for an inductor coil. An improved method for the operation of an inductor coil and an improved active transmission system with an oscillating circuit are also provided.

The driver circuit for an inductor coil according to the teachings of the present disclosure may comprise a capacitor, two inputs for the delivery of a reference voltage for the capacitor, and two outputs for the connection of the inductor coil to the capacitor. The driver circuit also comprises a first controllable switch, which is connected on one of the two inputs, and a second controllable switch, which is connected between the two outputs. A switching control device is configured for the measurement of a current flowing in the inductor coil or of a voltage on the capacitor and, according to the current flowing in the inductor coil or the voltage on the capacitor, for the control of the first and second switches such that, where the second switch is open, the first switch will initially be closed, in order to charge the capacitor up to the reference voltage. The first switch is then opened, such that the capacitor is discharged via the inductor coil in an oscillating manner. The second switch remains open until such time as the current in the inductor coil or the voltage on the capacitor has passed through at least one complete oscillating period, and is then closed.

Advantages of the driver circuit may include limited complexity of its circuitry and calibration, low current consumption, low radiation of interference signals, and limited sensitivity in respect of dimensional tolerances.

Moreover, a means of current limitation or current imposition may be connected in series with the first switch such that the capacitor, the switch, or the reference voltage source are not overloaded.

The switching control device may be configured for the detection of peak values in the current in the inductor coil or zero-crossings of the voltage on the capacitor and, following at least two peak current values or zero-crossings of the voltage, for the closing of the second switch. The detection of peak values or zero-crossings provides a simple and effective option for the determination of the end of an oscillating period.

The switching control device may be provided with a modulation input for a modulation signal, and may be configured for the control of switching cycles on the first switch and the second switch in accordance with said modulation signal, such that multiple options for application are advantageously provided.

The switching control device may also be configured for the execution of phase-shift keying modulation, amplitude-shift keying modulation or frequency-shift keying modulation on the antenna current. For modulation, the switching control device delivers an effective quality factor of 1, while the oscillating circuit operates at high quality and accordingly, is highly energy-efficient.

At least the first switch and the second switch may be configured as controllable semiconductor components such that, in a straightforward manner and with limited complexity, switching processes can be executed, even at high switching frequencies.

An ohmic resistance may be connected in series with the inductor coil, in order to increase the damping of the oscillating circuit formed by the capacitor and the inductor coil, if required, and/or to provide a simple arrangement for current measurement.

However, the switching control device may also be configured for the evaluation of the voltage discharge on the capacitor, where direct current measurement is not desired or is not practicable.

Preferably, the oscillating circuit formed by the capacitor and the inductor coil has a resonant frequency which is higher than the frequency to be used for transmission. For example, the resonant frequency may be between 5 and 30 percent higher than the frequency to be used for transmission.

A third controllable switch may be (directly or indirectly) connected in parallel with the capacitor, and may be actuated such that it discharges the capacitor upon the deactivation of the driver circuit. Accordingly, in the deactivated state, a specific voltage may be advantageously imposed upon the capacitor, for example 0V.

An example method for the operation of an inductor coil may provide various advantages, wherein a capacitor is charged to a reference voltage by means of a charging current, the charged capacitor is discharged in an oscillating manner via the inductor coil, and wherein the inductor coil is short-circuited when the current in the inductor coil or the voltage on the capacitor has passed through at least one complete oscillation period. A method of this type is highly efficient, and involves little complexity in its execution.

By this arrangement, the charging current of the capacitor can be limited or imposed, in order to protect against overcurrents.

In addition, peak values in the current in the inductor coil or zero-crossings of the voltage on the capacitor are detected and, following at least two peak current values or zero-crossings of the voltage, the inductor coil may be short-circuited. The detection of peak values or zero-crossings provides a simple and effective option for the determination of the end of an oscillating period.

Specifically, during application as a transmission system, the charging and discharging cycles of the inductor coil or the capacitor are controlled depending on a modulation signal.

To this end, phase-shift keying modulation, amplitude-shift keying modulation or frequency-shift keying modulation may be executed on the basis of the modulation signal. Accordingly, the charging and discharging cycles can be configured such that, while modulation proceeds with an effective quality of 1, the oscillation circuit operates at a high quality level, thereby resulting in a highly energy-efficient operation.

In some embodiments, for the purposes of current measurement, the discharge of voltage on the capacitor may be evaluated.

The capacitor may also be discharged upon the deactivation of the driver circuit, optionally by means of a means of current limitation or current imposition, such that, in the deactivated state, a specific state is assumed by the capacitor and the inductor coil.

An active transmission system may include an inductive antenna, a capacitor, and a reference voltage. The active transmission system also comprises two inputs, which are connected between the reference voltage and the capacitor, and two outputs, which are connected between the inductive antenna and the capacitor. A first controllable switch is connected on one of the two inputs, and a second controllable switch is connected between the two outputs.

A switching control device is configured for the measurement of a current flowing in the inductor coil or of a voltage on the capacitor, and for the control of the first and the second switches according to the current flowing in the inductor coil or to the voltage on the capacitor such that, when the second switch is open, the first switch is initially closed, in order to charge the capacitor up to the reference voltage. Thereafter, the first switch is opened, such that the capacitor is discharged via the inductor coil in an oscillating manner. The second switch remains open until such time as the current in the inductor coil or the voltage on the capacitor has passed through at least one complete oscillating period, and is then closed.

An active transmission system of this type can be advantageously employed, for example, in a keyless vehicle entry and start-up system such as, for example, a Passive Start Entry (PASE) system.

BRIEF DESCRIPTION OF THE DRAWINGS

The invention is described hereinafter in greater detail with reference to the exemplary embodiments shown in the figures in the drawings.

These represent the following.

DETAILED DESCRIPTION

Figure 1:
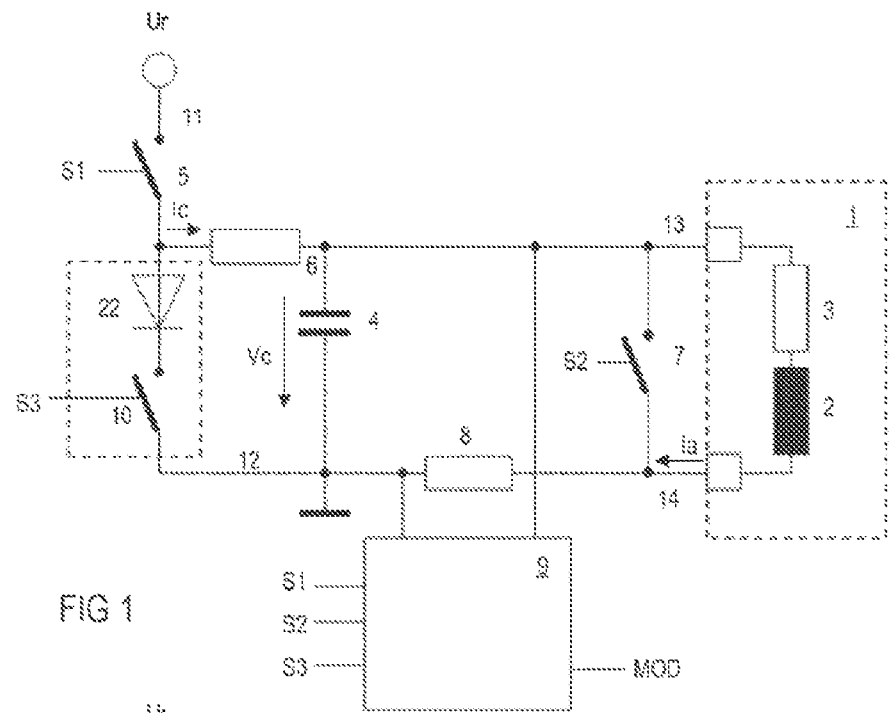
FIG. 1 shows a circuit diagram of an exemplary driver circuit for an inductor coil.

FIG. 1 shows an exemplary embodiment of a driver circuit for an inductor coil represented by an inductive antenna 1, for example a ferrite antenna in an active transmission system. The inductive antenna 1 may be substituted, as represented in FIG. 1, by an electrical series circuit comprised of a purely inductive circuit element 2 and an ohmic circuit element 3. A capacitor is coupled with two inputs 11, 12 for the delivery of a reference voltage Ur dictated by ground M, and with two outputs 13, 14 for the connection of the inductive antenna 1 to the capacitor 4. A first controllable switch 5 is connected on the upper 11 of the two inputs 11, 12 whereby, alternatively, it might also be connected on the lower 12 of the two inputs.

An ohmic resistance 6 for the limitation of current on the inputs 11, 12 is connected in series with the switch 5. A current source, or any other means of current imposition or current limitation, might be used in place of the ohmic resistance 6. A second controllable switch 7 is connected between the two outputs 13, 14. An ohmic resistance 8, which can be used for the damping of the oscillating circuit formed by the capacitor 4 and the inductive antenna 1 and/or as a measuring shunt for the measurement of a current Ia flowing in the inductive antenna 1, may be connected on the lower 14 of the two outputs 13, 14. Alternatively, the resistance 8 might be arranged on the other output 13, or be omitted altogether. Alternatively, for the determination of the number of oscillating periods, the (discharge of) voltage on the capacitor 4 might be evaluated, for example, by a corresponding measuring device or a switching control device 9.

The switching control device 9, which taps off and evaluates a voltage Vc on the capacitor 4, determines, for example, the zero-crossings of the voltage Vc (or, alternatively, the peak values of the current Ia or peak values for the discharge of the voltage Vc). Where the switch 7 is open (control signal S2), by means of the control executed by the switching control device 9, the first switch 5 is closed by means of a control signal S1, in order to charge the capacitor 4 to the reference voltage Ur, whereby the current Ia begins to flow in the inductive antenna 1. Thereafter, the first switch 5 is opened, in order to discharge the capacitor 4 via the inductive antenna 1 in an oscillating manner, e.g., by the execution of at least one full oscillation, whereby the second switch 7 is not closed until the current Ia in the inductive antenna 1 has passed through at least one complete oscillation period (or a plurality thereof) and the voltage Vc on the capacitor is zero. Alternatively, the switching control device 9 can evaluate the voltage over the resistance 8, which voltage is proportional to the current Ia, in a corresponding manner.

In some embodiments, a third controllable switch 10 in combination with a series-connected diode 22 may be connected directly or—as indicated—via the resistance 6 in parallel to the capacitor 4. The switch 10 may be controlled by a control signal S3 such that it discharges the capacitor 4 in the event of the deactivation of the driver circuit. The switching control device 9 delivers the control signals S1, S2 and S3 for the switches 5, 7 and 10, and may also be provided with a modulation input for a modulation signal MOD.

Figure 2:
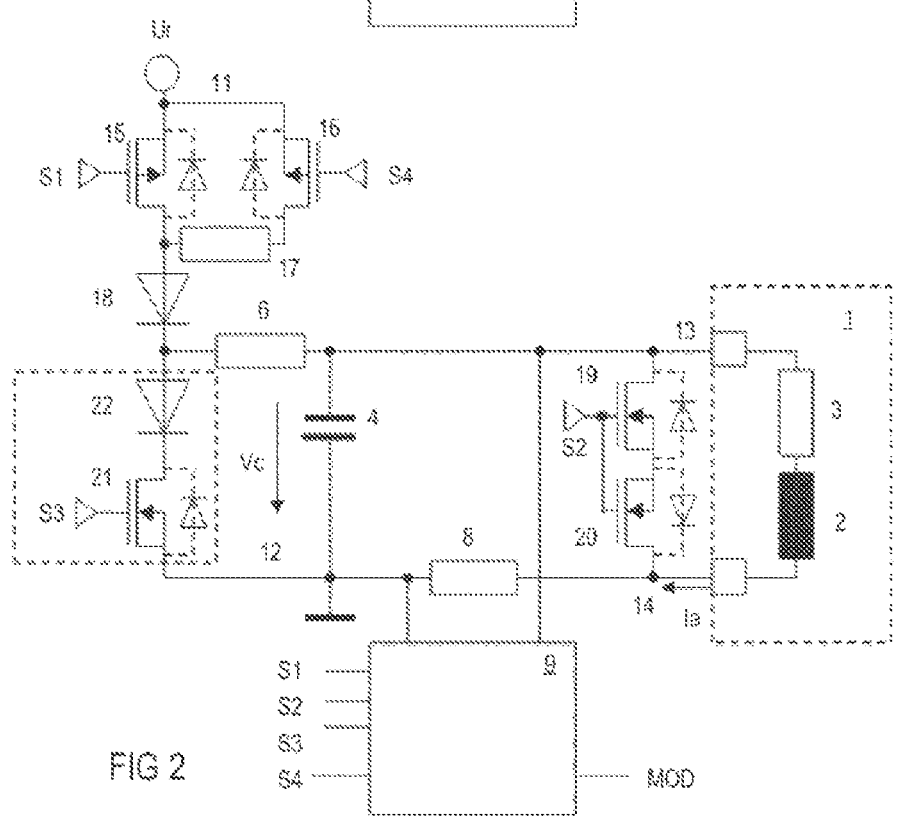
FIG. 2 shows a circuit diagram of the driver circuit represented in FIG. 1, in which semiconductor switches are used.

As shown in FIG. 2, semiconductor switches or semiconductor components such as field effect transistors, specifically MOS field effect transistors ("MOS" is the abbreviation for "Metal Oxide Semiconductor"), either individually or in combination, may be used as the controllable switches 5, 7 and 10. For example, the controllable switch 5 may be replaced by two MOS field effect transistors 15 and 16 of the p-channel enhancement type. To this end, the MOS field effect transistor 15, with its associated drain-source path, is connected directly on the input 11, whereas the drain-source path of the MOS field effect transistor 16 is connected in parallel with the drain-source path of the MOS field effect transistor 15 via an intervening resistance 17. The gate of the MOS field effect transistor 15 is controlled by the control signal S1 delivered by the switching control device 9, whereas the gate of the MOS field effect transistor 16 is controlled by a control signal S4 from the MOS field effect transistor 16.

The switch 7 may be configured, for example, as two MOS field effect transistors 19 and 20 of the n-channel enhancement type, the drain-source paths of which are connected in an anti-serial arrangement between the outputs 13 and 14, such that the anti-series-connected drain-source paths are connected in parallel to the inductive antenna 1. The gates of the MOS field effect transistors 19 and 20 are interconnected, and are controlled by the control signal S2 delivered by the switching control device 9. On the input 11, a diode 18 may be connected in series to the drain-source paths of the transistors 15 and 16.

The switch 10 may be configured, for example, as a single MOS field effect transistor 21 of the n-channel enhancement type, the drain-source path of which is connected between the diode 22 and ground, and the gate of which is controlled by the control signal S2 from the switching control device 9. In addition to the MOS field effect transistors represented (of any conductor type), any other types of appropriate controllable switches might be employed, specifically controllable semiconductor switches, also in combination with corresponding drivers, bootstrap circuits, charge pumps or similar.

Figure 3:
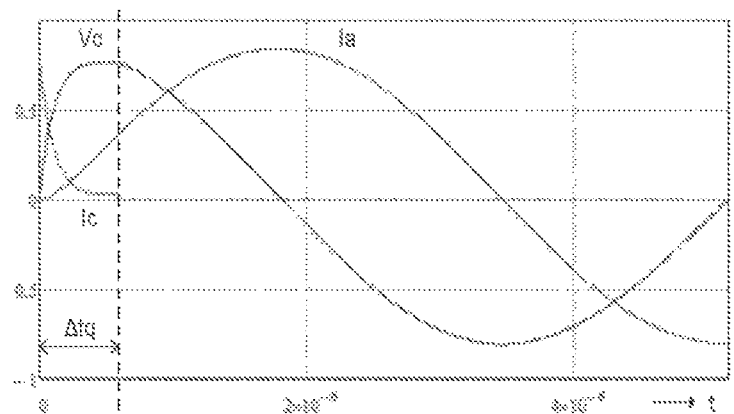
FIG. 3 shows a diagram representing the voltage characteristic on the capacitor of the driver circuit, the characteristic of the current flowing in the capacitor of the driver circuit and that of the current flowing in the antenna, during and after charging respectively.

FIG. 3 shows the characteristic of the voltage Vc on the capacitor 4, the characteristic of the current Ic (charging current) flowing in the capacitor 4 and of the current Ia flowing in the antenna 1, during and after charging respectively. Immediately after the closing of the switch 5, the current Ic is initially at its maximum value, then declines exponentially in a complementary manner to the rise in the voltage Vc on the capacitor 4 as the latter is charged and current flows in the antenna 1 already. The current Ia in the antenna 1 rises in a correspondingly slow manner in response to the inductive behavior thereof and the rising voltage Vc. After a specific time interval Δtq, where the capacitor 4 has been charged to its maximum voltage, the switch 5 is opened, thereby terminating the charging process and initiating quasi-resonant operation, during which the capacitor 4 is discharged via the antenna 1. Upon the second zero-crossing of the voltage Vc on the capacitor 4, the switch 7 is closed, thereby terminating quasi-resonant operation, at least for the time interval considered. Thereafter, depending upon the application, the sequence described above may be repeated.

Figure 4:
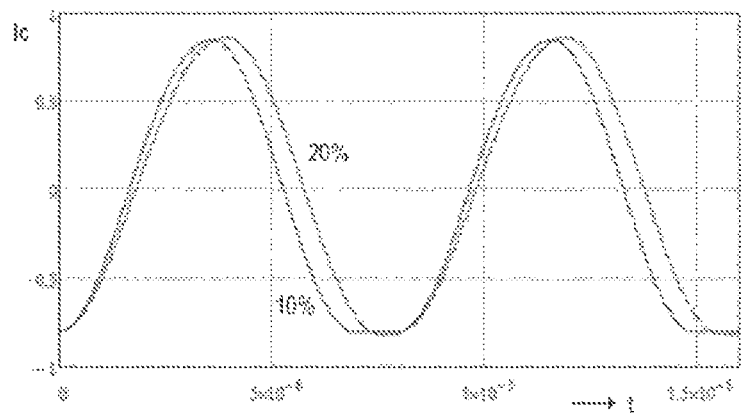
FIG. 4 shows a diagram of the current characteristic in the inductor coil over two oscillation periods.
Figure 5:
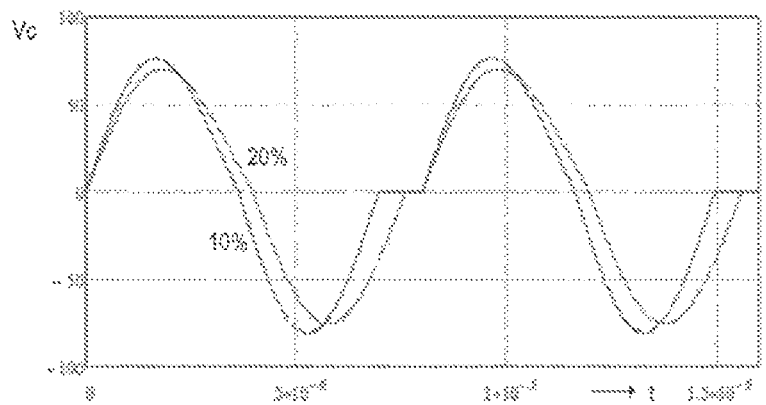
FIG. 5 shows a diagram of the voltage characteristic on the capacitor over two oscillation periods.

FIG. 4 shows the characteristic of the current Ia in the inductive antenna 1 over the time interval t for two oscillation periods following the opening of the switch 1, e.g., charging to the reference voltage Ur has been completed, and the energy stored in the antenna 1 flows into the capacitor 4 in the form of the current Ia. The antenna 1 is discharged accordingly, and the capacitor 4 is charged by this energy. Quasi-resonant operation then begins, during which the energy stored in the capacitor 4 also flows back into the antenna 1, is stored in the latter, then flows back to the capacitor 4 once more. At the end of this cycle, the switch 5 may be closed for a specific duration, such that the oscillation period is extended to the required duration by a time interval Δt2. The associated voltage characteristic on the capacitor 4 over the two oscillating periods is represented in FIG. 5. The two curves represented in FIGS. 4 and 5 correspond to an extension by 10% and 20% respectively. Energy losses may be offset, for example, by an additional intermediate charging with the reference voltage Ur for a duration Δt1, shortly after the start of the discharge phase of the capacitor 4, for which purpose, for example, a lower current may be used (for example, connected via the transistor 16 and limited by the resistance 17).

Figure 6:
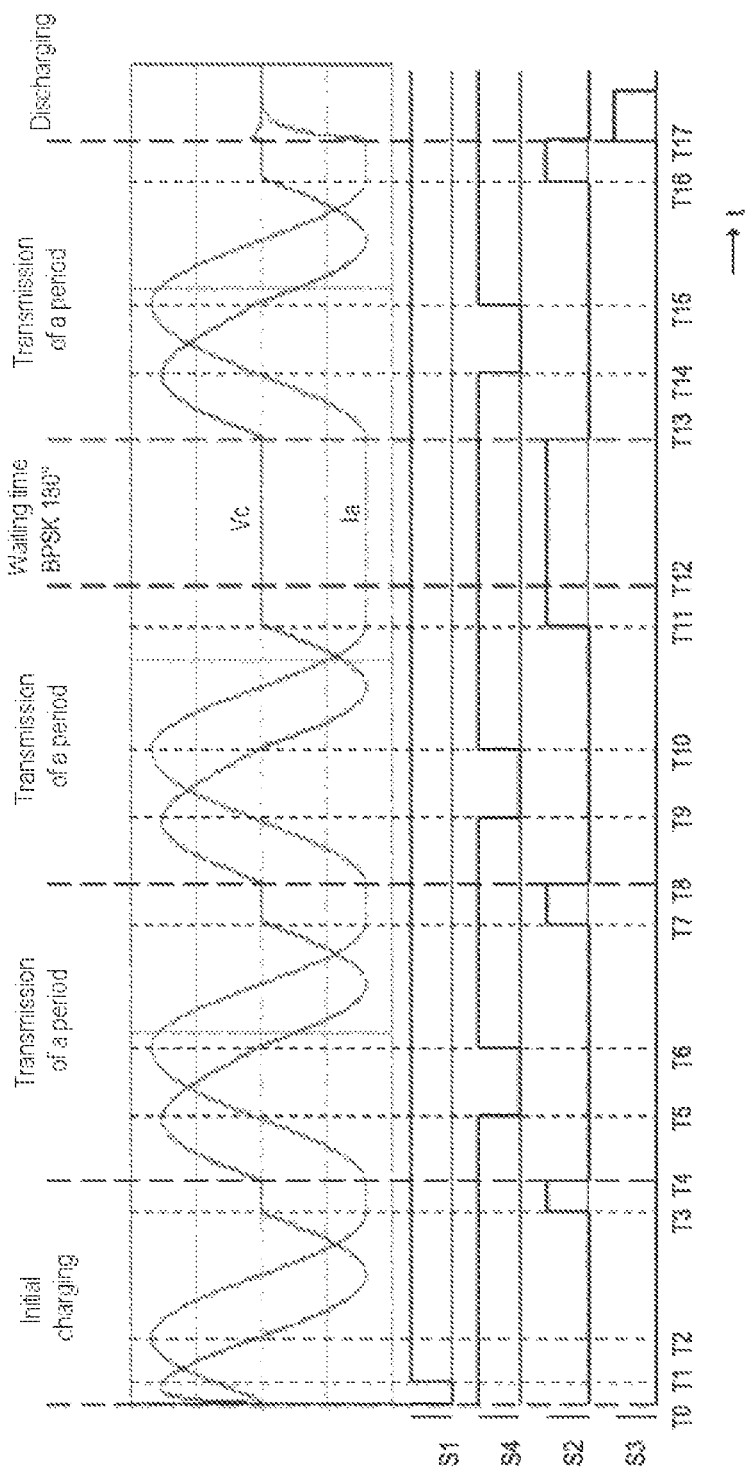
FIG. 6 shows a diagram of the voltage characteristic on the capacitor of the driver circuit, and of the current in the inductor coil, in relation to the control signals delivered by the switches and a modulation signal.

The characteristic of the voltage Vc over the time t on the capacitor 4, in accordance with the control signals S1, S2, S3 and S4 on the driver circuit represented in FIG. 2, in the case of bi-phase-shift keying modulation (BPSK modulation) is represented in FIG. 6. Initially, during a charging phase at time T0 the initial charging of the capacitor 4 from, for example, 0V to the reference voltage Ur commences (with transistor 15 conducting), the voltage Vc on the capacitor 4 increases accordingly, for example from 0V to the reference voltage Ur, for example in an exponential manner. The full charge is achieved at a time T1, and the transistor 15 (c.f. control signal S1) is blocked. The current Ia flowing in the antenna increases slowly, as the antenna 1 is supplied from the outset with an increasing voltage Vc, and then reaches its maximum value before declining again, as the voltage Vc on the capacitor 4 has already begun to fall.

The voltage Vc passes through zero (at time T2) and is then reversed, as the capacitor 4 is now charged by the energy in the antenna 1. The voltage Vc completes half an oscillation period and, upon the second zero-crossing of the voltage Vc at a time T3, the series circuit comprised of the transistors 19 and 21 is switched to the conductive state, and short-circuits the antenna 1 (and the capacitor 4) up to a time T4. As a result of induction, the current Ia flows via the series circuit of the transistors 19 and 21 and, accordingly, flows in the antenna 1 once more.

At time T4, the oscillating discharge phase of the inductive antenna 1 via the capacitor 4 is initiated. Accordingly, the voltage Vc on the capacitor 4 rises again (for example sinusoidally), achieves its maximum value at a time T5, at which point the transistor 16 is switched to the conductive state such that, up to a time T6, recharging to the reference voltage Ur can be executed via the resistance 17. The voltage Vc again passes through zero and is then reversed, as the capacitor 4 is now charged by the energy in the antenna 1. The voltage Vc rises again and, upon the second zero-crossing of the voltage Vc at a time T7, switches the series circuit comprised of the transistors 19 and 21 to the conductive state, and short-circuits the antenna 1 (and the capacitor 4) up to a time T8. As a result of induction, the current Ia again flows via the series circuit of the transistors 19 and 21 and, accordingly, also further in the antenna 1.

The oscillating discharge described above, and the associated behavior of the voltage Vc and the current Ia between the times T4 and T8 (including times T5, T6 and T7) may be repeated, for example, between subsequent time points, for example between times T8 and T12 (including the corresponding times T9, T10 and T11) and between times T13 and T17 (including the corresponding times T14, T15 and T16). At time T12, however, there is an extended waiting period until time T13, which is attributable to a 180° phase displacement associated with BPSK modulation. Again, during this time, the series circuit comprising the transistors 19 and 21 is in the conductive state. During the oscillating discharge phases, the antenna 1 transmits an electromagnetic signal (of at least one oscillating period in each case). After time T17, for example, a discharge phase commences, whereby the transmission process (comprised of multiple oscillating periods) is terminated.

In accordance with the switching performance of the transistors 15, 16, 19, 20 and 21, the control signal S1 with effect from time T1 up to the end of the transmission process is in an H (high) state, i.e. transistor 15 is blocked. Between times T5 and T6, T9 and T10, and T14 and T15, the control signal S4 assumes the L state (transistor 16 conducting), and otherwise assumes the H state (transistor 16 blocked). Between times T3 and T4, T7 and T8, T11 and T13, and T16 and T17, the control signal S2 assumes the H state (transistors 19 and 20 conducting), and otherwise assumes the L state (transistors 19 and 20 blocked). Other than in the final discharge phase, the control signal S2 assumes the L state (transistor 10 blocked, other than in the final discharge phase). As anticipated, the phase displacement between the voltages on and the currents in the resonant circuit is of the order of 90°. By means of the modulation signal MOD, the time during which the transistors 19 and 20 are in the conductive state can be controlled.

Figure 7:
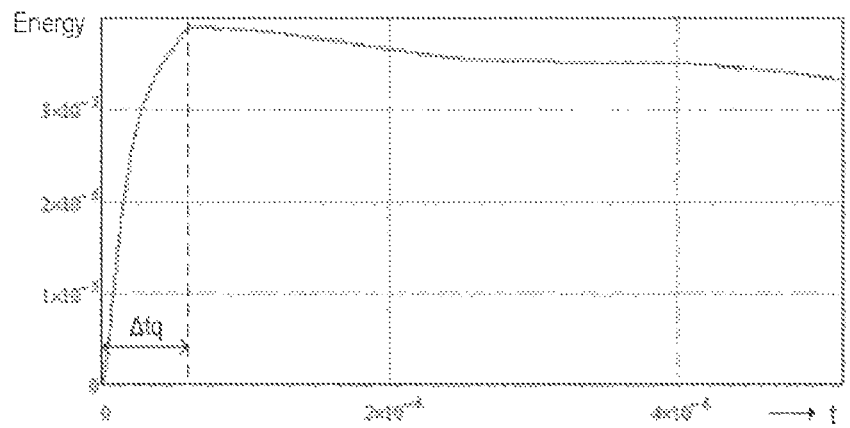
FIG. 7 shows a diagram of the energy characteristic in the resonant circuit, during and after charging.
Figure 8:
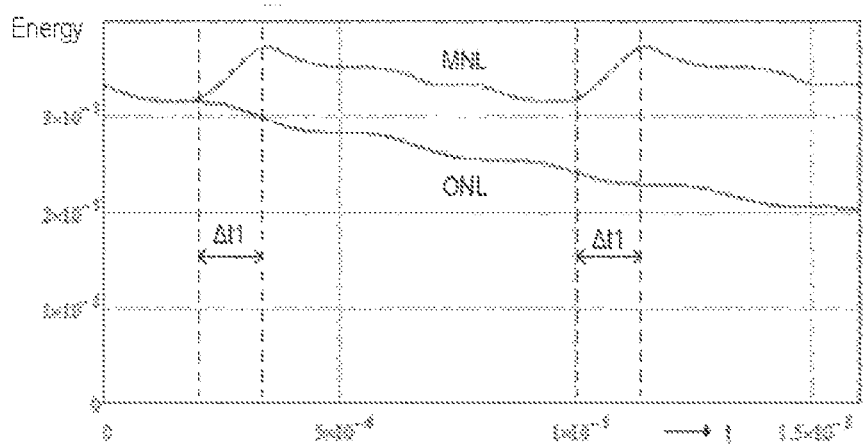
FIG. 8 shows a diagram of the energy characteristic in the resonant circuit over two oscillating periods.

FIG. 7 shows the energy characteristic in the resonant circuit, during and after charging. Upon the initial charging of the capacitor 4, the transistor 15 is in the conductive state for the time interval Δtq, and then assumes the blocked state once more. The energy in the resonant circuit is initially in the charged state, then declines with a time-related change which is dictated by the Q-factor of the resonant circuit. Where recharging is executed repeatedly for a sufficient time, for example a time interval Δt1, the energy in this device will not decline—as will be seen from FIG. 8, in which the energy characteristic over two oscillation periods is represented for the case with recharging (MNL) and without recharging (ONL).

Figure 9:
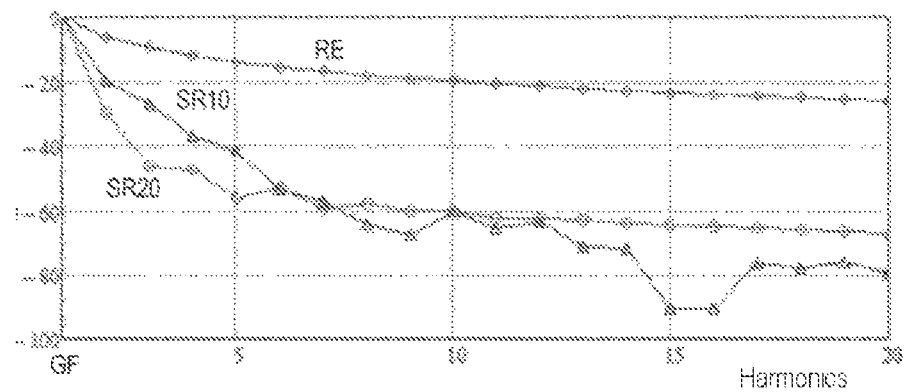
FIG. 9 shows a diagram of the current harmonic damping characteristic of the inductor coil.
Figure 10:
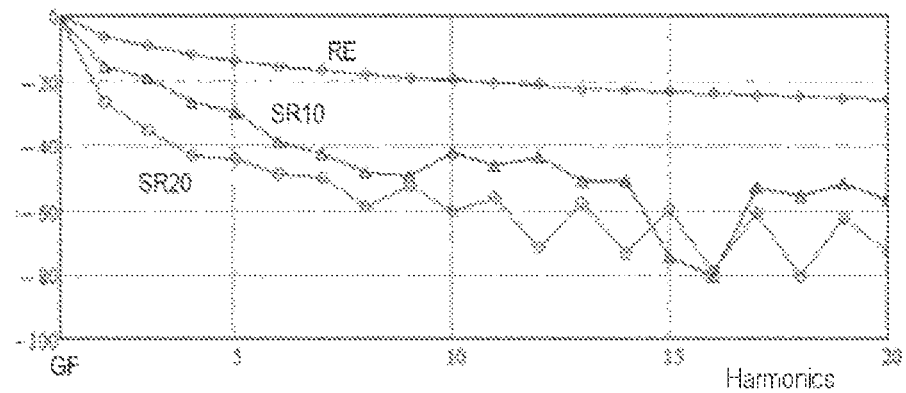
FIG. 10 shows a diagram of the voltage harmonic damping characteristic of the inductor coil.

FIG. 9 shows the current harmonic damping characteristic of the inductor coil, in relation to a fundamental frequency GF, at a serial resonant frequency SR10, which is 10% higher than the fundamental frequency GF, and at a serial resonant frequency SR20, which is 20% higher than the fundamental frequency GF. For comparison, the damping of current harmonics by the actuation of a serial resonant circuit comprised of the inductor coil and a capacitor, with a rectangular-pulse signal RE. The associated voltage harmonic damping characteristic of the inductor coil is represented in FIG. 10.

It will be observed that the present method, in comparison with known methods involving rectangular-pulse signals, is significantly more effective in respect of the energy input associated with harmonics and it generates less stray energy and, accordingly, is advantageous in respect of electromagnetic compatibility (EMC) while simultaneously being less complex, as will be seen from FIGS. 1 and 2. The rectangular-pulse operation of the antenna generates only odd harmonics whereas, in the present case, both even and odd harmonics are generated. The favorable performance of the present driver circuit is attributable to the fact that, over a substantial range, the current Ia flowing in the antenna 1 is sinusoidal, and only the interruption during the recharging time between the sinusoidal oscillations contributes to the generation of harmonic components. The amplitudes of the fundamental oscillation and the harmonics vary in accordance with the ratio between the resonant frequency of the antenna and the carrier frequency.

In the embodiment represented in FIG. 6, BPSK modulation has been assumed. Similarly, many other alternative forms of modulation are appropriate, including, for example, ASK modulation ("ASK" stands for "Amplitude Shift Keying") or FSK modulation ("FSK" stands for "Frequency Shift Keying").

In the present driver circuit, BPSK modulation means that 180° phase displacements are incorporated into the carrier signal, in relation to the logic value to be transmitted. For example, for the logic value L, a phase displacement of 0° may be applied and, for the logic value H, a phase displacement of 180° may be applied. In the present driver circuit, a phase displacement of 180° is achieved by the relevant discharging process being executed with a corresponding time delay. Although, in the present driver circuit, the quality factor Q is very high in any event, BPSK modulation is applied forthwith, such that the quality factor Q appears to be equal to one. Accordingly, the loss of energy is extremely low, as the resonant circuit comprised of the capacitor 4 and the antenna 1 does not need to be discharged for the purposes of modulation.

In ASK modulation, two different amplitudes are generated, according to the logic value to be transmitted. In one specific form, OOK (On-Off Keying), one of the amplitude values is equal to zero and the other, for example, is equal to the maximum value. In relation to the present driver circuit, this particular type of modulation means that the antenna 1 is permanently switched-out for such time, for example, as the logic value L is to be transmitted, and the antenna 1 is otherwise switched-in, if the logic value H is to be transmitted. This corresponds to a phase displacement of n-times 360° for a duration of n carrier periods. Again in this case, the quality factor is one and, here again, no energy is tapped from the system for the purposes of modulation.

In FSK modulation, a dedicated carrier frequency is provided for each logic value. In the present driver circuit, a corresponding phase displacement is incorporated after each discharging phase for the generation of a carrier frequency which is lower than the nominal carrier frequency. Again in this case, the quality factor is one and, here again, no energy is tapped from the system for the purposes of modulation.

The driver circuit according to the invention and the active transmission system according to the invention are advantageous, in that high oscillating circuit quality factors Q can be achieved with no impairment of transmission quality, and without the requirement for a specific quality factor Q, in that EMC emissions are comparatively very low, in that the power loss is very low, and in that the use of multiplexers permits the operation of a number of different antennae with the same driver.

LIST OF REFERENCES 1 antenna
2 purely inductive element
3 purely ohmic element
4 capacitor
5 first controllable switch
6 resistance
7 second controllable switch
8 resistance
9 switching control device
10 third controllable switch
11 input
12 input
13 output
14 output
15 MOS field effect transistor
16 MOS field effect transistor
17 resistance
18 diode
19 MOS field effect transistor
20 MOS field effect transistor
21 MOS field effect transistor
22 diode
GF fundamental frequency
H state
Ia current in the antenna
Ic charging current
L state
MNL curve "with recharging"
MOD modulation signal
ONL curve "without recharging"
RE rectangular pulse signal
S1 control signal
S2 control signal
S3 control signal
S4 control signal
SR10 curve for "serial resonant frequency 10% above fundamental frequency"
SR20 curve for "serial resonant frequency 20% above fundamental frequency"
t time
Δtq time interval
Δt1 time interval
T0-T17 time points
Ur reference voltage
Vc voltage on the capacitor

What is claimed is:

1. A driver circuit for an inductor coil, the driver circuit comprising:
    a capacitor;
    two inputs for the delivery of a reference voltage (Ur) for the capacitor;
    two outputs for the connection of the inductor coil to the capacitor;
    a first controllable switch connected to one of the two inputs;
    a second controllable switch connected between the two outputs; and
    a switching control device configured for the measurement of a voltage on the capacitor or of a current flowing in the inductor coil and, according to the voltage on the capacitor or the current flowing in the inductor coil;
    wherein the switching control device operates to control the first switch and the second switch such that, where the second switch is open, the first switch is initially closed, in order to charge the capacitor up to the reference voltage,
    after the capacitor is charged to the reference voltage, the first switch is then opened, such that the capacitor is discharged via the inductor coil in an oscillating manner, and
    the second switch remains open until such time as the voltage on the capacitor or the current in the inductor coil has passed through at least one complete oscillating period, and is then closed.

2. The driver circuit as claimed in claim 1, wherein a means of current limitation or current imposition is connected in series with the first switch.

3. The driver circuit as claimed in claim 1, further comprising the switching control device configured for the detection of zero-crossings of the voltage on the capacitor or peak values of the current flowing in the inductor coil and, following at least two zero-crossings of the voltage or peak values in the current, for the closing of the second switch.

4. The driver circuit as claimed in claim 1, wherein the switching control device comprises a modulation input for a modulation signal, and is configured for the control of switching cycles on the first switch and the second switch in accordance with said modulation signal.

5. The driver circuit as claimed in claim 4, further comprising the switching control device configured for the execution of phase-shift keying modulation, amplitude-shift keying modulation, or frequency-shift keying modulation.

6. The driver circuit as claimed in claim 1, wherein the first switch and the second switch are configured as controllable semiconductor components.

7. The driver circuit as claimed in claim 1, further comprising an ohmic resistance connected in series with the inductor coil.

8. The driver circuit as claimed in claim 1, further comprising the control device configured for the evaluation of the discharge of voltage on the capacitor.

9. The driver circuit as claimed in claim 1, wherein a resonant circuit formed by the capacitor and the inductor coil has a resonant frequency higher than the frequency to be used for transmission.

10. The driver circuit as claimed in claim 9, wherein the resonant frequency is between 5 and 30 percent higher than the frequency to be used for transmission.

11. The driver circuit as claimed in claim 1, further comprising a third controllable switch connected in parallel with the capacitor and actuated to discharge the capacitor upon the deactivation of the driver circuit.

12. A method for the operation of an inductor coil, the method comprising:
   charging a capacitor to a reference voltage by means of a charging current,
   discharging the charged capacitor in an oscillating manner via the inductor coil, and
   short-circuiting the inductor coil when a voltage on the capacitor or a current flowing in the inductor coil has passed through at least one complete oscillation period,
   wherein two inputs deliver a reference voltage for the capacitor,
   wherein two outputs connect the inductor coil to the capacitor,
   wherein a first controllable switch is connected to one of the two inputs,
   wherein a second controllable switch is connected between the two outputs, and
   wherein a switching control device measures a voltage on the capacitor or a current flowing in the inductor coil and, according to the voltage on the capacitor or the current flowing in the inductor coil, controls the first switch and the second switch such that, where the second switch is open, the first switch is initially closed, in order to charge the capacitor up to the reference voltage,
   the first switch is then opened, such that the capacitor is discharged via the inductor coil in an oscillating manner, and the second switch remains open until such time as the voltage on the capacitor or the current in the inductor coil has passed through at least one complete oscillating period, and is then closed.

13. The method as claimed in claim 12, wherein the charging current of the capacitor is limited or imposed.

14. The method as claimed in claim 12, wherein zero-crossings of the voltage on the capacitor or peak values in the current flowing in the inductor coil are detected and, following at least two zero-crossings of the voltage or two peak current values, the inductor coil is short-circuited.

15. The method as claimed in claim 12, wherein the charging and discharging cycles of the capacitor are controlled depending on a modulation signal.

16. The method as claimed in claim 15, wherein phase-shift keying modulation, or amplitude-shift keying modulation, or frequency-shift keying modulation is executed on the basis of the modulation signal.

17. The method as claimed in claim 12, wherein the discharge of voltage on the capacitor is evaluated for the purposes of current measurement.

18. The method as claimed in claim 12, wherein the capacitor is discharged upon the deactivation of the driver circuit.

19. An active transmission system comprising:
   an inductive antenna;
   a capacitor;
   a reference voltage;
   two inputs connected between the reference voltage and the capacitor;
   two outputs connected between the inductive antenna and the capacitor;
   a first controllable switch connected to one of the two inputs;
   a second controllable switch connected between the two outputs; and
   a switching control device configured for the measurement of a voltage on the capacitor or of a current flowing in the inductor coil and, according to the voltage on the capacitor or the current flowing in the inductor coil, for the control of
   the first switch and the second switch such that, where the second switch is open, the first switch is initially closed, in order to charge the capacitor up to the reference voltage,
   the first switch is then opened, such that the capacitor is discharged via the inductor coil in an oscillating manner, and
   the second switch remains open until such time as the voltage on the capacitor or the current in the inductor coil has passed through at least one complete oscillating period, and is then closed.

* * * * *